ated under 35

United States Patent
Gupta et al.

(10) Patent No.: US 8,146,079 B2
(45) Date of Patent: Mar. 27, 2012

(54) SYSTEMS AND METHODS FOR CONTROLLING RESOURCE USAGE BY A DRIVER DOMAIN ON BEHALF OF A VIRTUAL MACHINE

(75) Inventors: Diwaker Gupta, Fort Collins, CO (US); Ludmila Cherkasova, Fort Collins, CO (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1644 days.

(21) Appl. No.: 11/494,187

(22) Filed: Jul. 26, 2006

(65) Prior Publication Data

US 2008/0028076 A1   Jan. 31, 2008

(51) Int. Cl.
*G06F 9/455* (2006.01)
*G06F 9/46* (2006.01)
(52) U.S. Cl. ............. 718/1; 718/104; 709/223; 709/226
(58) Field of Classification Search .............. 718/1, 102, 718/103, 104; 719/321, 324; 709/223, 226
See application file for complete search history.

(56) References Cited

U.S. PATENT DOCUMENTS

| | | | |
|---|---|---|---|
| 5,675,762 A | 10/1997 | Bodin et al. | |
| 6,463,352 B1 | 10/2002 | Tadokoro et al. | |
| 6,795,966 B1 * | 9/2004 | Lim et al. | 718/1 |
| 7,089,558 B2 * | 8/2006 | Baskey et al. | 718/104 |
| 7,191,440 B2 * | 3/2007 | Cota-Robles et al. | 718/1 |
| 7,770,173 B2 * | 8/2010 | Farrell et al. | 718/104 |
| 7,779,424 B2 * | 8/2010 | Cherkasova et al. | 719/321 |
| 7,788,411 B2 * | 8/2010 | Belgaied et al. | 709/250 |
| 7,797,707 B2 * | 9/2010 | Cherkasova et al. | 719/310 |
| 2003/0037089 A1 * | 2/2003 | Cota-Robles et al. | 709/1 |
| 2006/0173871 A1 * | 8/2006 | Taniguchi et al. | 707/100 |
| 2006/0200821 A1 * | 9/2006 | Cherkasova et al. | 718/1 |
| 2007/0050763 A1 * | 3/2007 | Kagan et al. | 718/1 |
| 2007/0192765 A1 * | 8/2007 | Shimogawa et al. | 718/1 |

OTHER PUBLICATIONS

Barham, P. et al., "Xen and the Art of Virtualization", In SOSP '03: Proceedings of the nineteenth ACM symposium on Operating systems principles, pp. 164-177.

Cherkasova, L. et al., "Measuring CPU Overhead for I/O Processing in the Xen Virtual Machine Monitor"; Accepted to 2005 Usenix Annual Technical Conference; 6 pages.

Chase, Jeffrey et al., Sharing and Protection in a Single-Address-Space Operating System, ACM Trans. Comput. Syst., 12(4), 1994; pp. 271-307.

Chun, Brent et al., "PlanetLab: An Overlay Testbed for Broad-Coverage Services", SIG-COMM Comput. Commun. Rev., 33(3); 2003, pp. 3-12.

(Continued)

*Primary Examiner* — Van Nguyen

(57) ABSTRACT

A method comprises determining an amount to which resource usage by a driver domain on behalf of a given virtual machine (VM) is to be limited. The method further comprises controlling the resource usage by the driver domain on behalf of the given VM so as not to exceed the determined amount. A system comprises a VM, a driver domain, and a shared resource that is usable by the VM and by the driver domain. The system further comprises a controller for limiting usage of the shared resource by the driver domain on behalf of the VM to prevent the usage of the shared resource by the driver domain on behalf of the VM from exceeding a determined amount.

19 Claims, 6 Drawing Sheets

OTHER PUBLICATIONS

Druschel, Peter et al., "Lazy Receiver Processing (LRP): A Network Subsystem Architecture for Server Systems", In OSDI '96: Proceedings of the second USENIX symposium on Operating systems design and implementation, New York 1996, pp. 261-275.

Fraser, K. et al., "Reconstructing I/O", Technical Report UCAM-CL-TR-596, University of Cambridge, 2005; pp. 1-16.

Gupta, D. et al., "XenMon: QoS Monitoring and Performance Profiling Tool"; Technical Report HPL-2005-187, HP Labs, 2005, pp. 1-13.

Httperf. [online] Retrieved Jul. 12, 2006 Retrieved from: http://www.hpl.hp.com/research/linux/httperf/ 10 pages.

IBM. The Oceano Project; [online] Retrieved on Jul. 11, 2006 Retrieved from: http://www.research.ibm.com/oceanoproject/index.html 1 page.

Kallahalla, M. et al., "Soft UDC: A Software-Based Data Center for Utility Computing", IEEE Computer, No. 2004, pp. 46-54.

Leslie, Ian et al., "The Design and Implementation of an Operating System to Support Distributed Multimedia Applications", IEEE Journal of Selected Areas in Communications, 14(7), 1996, pp. 1280-1297.

Mogul, J.C., et al, "Eliminating Receive Livelock in an Interrupt-driven Kernel"; ACM Trans. Comput. Syst., 15(3), 1997, 14 pages.

Nagar, S., et al., "Improving Linux Resource Control Using CKRM", Ottawa Linux Symposium, 2004, 16 pages.

Waldspurger, C. et al., "Memory Resource Management in VMware ESX Server", SIGOPS Oper. Syst. Rev., 36(SI), 2002 pp. 181-194.

Whitaker, A. et al., "Scale and Performance in the Denali Isolation Kernel"; SIGOPS Oper. Syst. Rev., 36(SI), 2002, pp. 195-209.

U.S. Appl. No. 11/070,674, filed Mar. 2, 2005.

\* cited by examiner

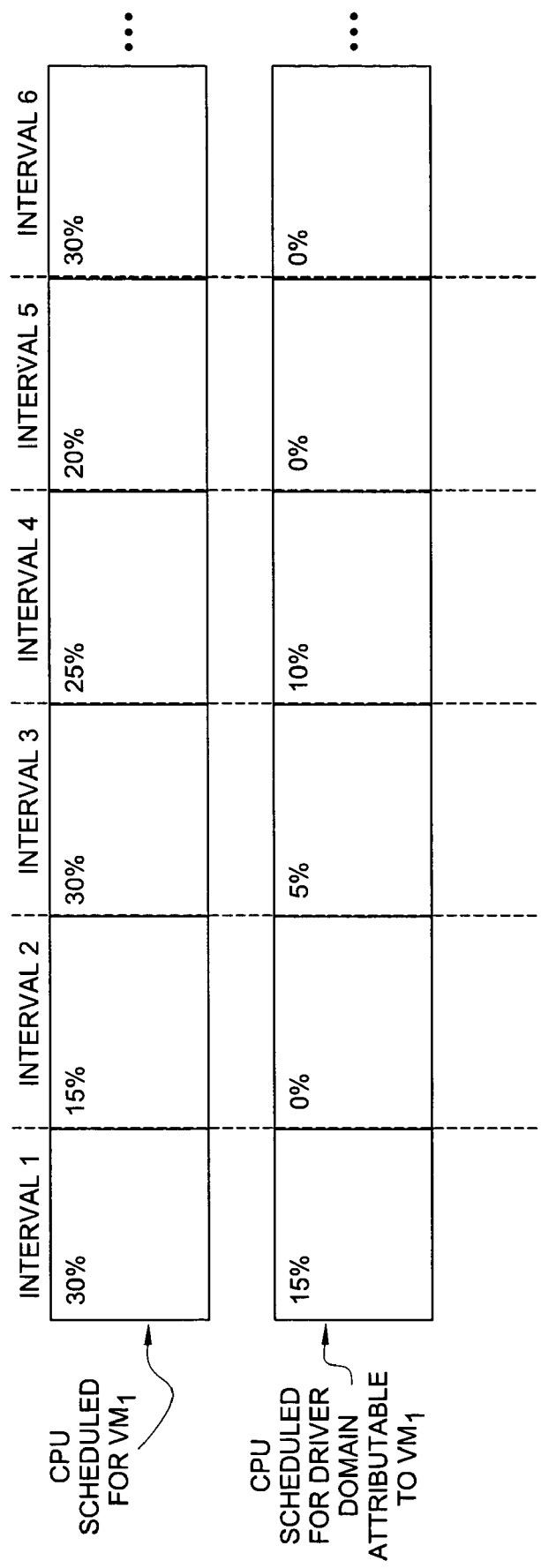

SYSTEMS AND METHODS FOR CONTROLLING RESOURCE USAGE BY A DRIVER DOMAIN ON BEHALF OF A VIRTUAL MACHINE

CROSS-REFERENCE TO RELATED APPLICATIONS

This application is related to co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. This application is also related to the following concurrently filed and commonly assigned U.S. patent applications: 1) Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", 2) Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", 3) Ser. No. 11/493,348 titled "SYSTEM AND METHOD FOR CONTROLLING AGGREGATE CPU USAGE BY VIRTUAL MACHINES AND DRIVER DOMAINS", 4) Ser. No. 11/493,250 titled "SYSTEM AND METHOD FOR CONTROLLING AGGREGATE CPU USAGE BY VIRTUAL MACHINES AND DRIVER DOMAINS OVER A PLURALITY OF SCHEDULING INTERVALS", and 5) Ser. No. 11/494,187 titled "SYSTEM AND METHODS FOR FLEXIBLY CONTROLLING RESOURCE USAGE BY A DRIVER DOMAIN ON BEHALF OF A VIRTUAL MACHINE", the disclosures of which are hereby incorporated herein by reference.

FIELD OF THE INVENTION

The below description is related generally to controlling resource utilization, and more particularly to systems and methods for controlling an amount of CPU usage by a driver domain on behalf of a virtual machine.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "processor resource," as used herein, refers to any computing resource now known or later developed that a consumer utilizes in servicing a workload, including without limitation central processing unit(s) (CPU(s)).

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a processor scheduler that monitors its workloads' demands and dynamically varies the allocation of processor capacity, e.g., CPU, to the workloads, thereby managing the utilization of the processor resources by the various consumers. For instance, the scheduler may dynamically vary allocation of the processor's capacity in a manner that attempts to provide each consumer with access only to the capacity it needs (for servicing its current workload). As a workload's demand increases, the scheduler may increase the amount of the processor's capacity that is allocated to such workload; and as a workload's demand decreases, the scheduler may decrease its allocation of the processor's capacity to such workload. Schedulers are well known for scheduling access to shared processor resources for competing consumers.

Traditionally, general-purpose operating systems assume that they have complete control of a system's physical resources. The operating system ("OS") thus assumes responsibility for such system management as allocation of physical resources, communication, and management of external storage, as examples. Virtualization changes this assumption of sole responsibility by a single OS for management of the system. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as VMware™ available from VMware, Inc. (see http://www.vmware.com). An abstraction created by VMM is called a virtual machine (VM). Accordingly, a VMM aids in subdividing the ample resources of a modern computer and creating the illusion of multiple virtual machines each running a separate OS instance.

Traditionally, schedulers separately schedule CPU access for different VMs and driver domains. As an example, a weighted proportional-share scheduler may schedule CPU access to different VMs in proportion to a respective weight assigned to each VM. However, a VM may require an access of a device driver in a driver domain, and thus the device driver may consume additional CPU utilization on behalf of the requesting VM. As such, the combined CPU utilization of a VM and a driver domain on behalf of such VM may effectively cause the total CPU usage attributable to the VM to become out of proportion to the VM's respective weight. Thus, a desire exists for a system and method for controlling (e.g., limiting) an amount of CPU usage by a driver domain on behalf of a given VM.

BRIEF DESCRIPTION OF THE DRAWINGS

FIG. 7 shows an exemplary scheduling scenario according to one embodiment of the present invention;

DETAILED DESCRIPTION

Figure 1:
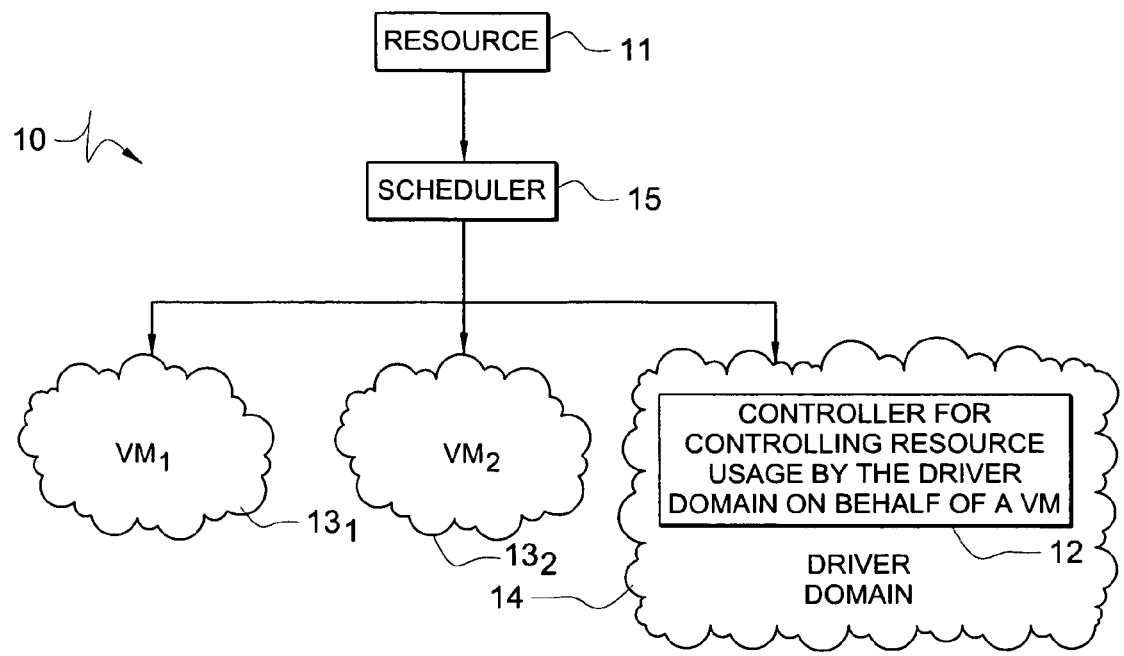
FIG. 1 shows an exemplary system according to an embodiment of the present invention.

FIG. 1 shows an exemplary system according to an embodiment of the present invention. System 10 comprises a resource 11 (e.g., CPU), and various consumers, such as virtual machines (VMs) $13_1$ and $13_2$ and driver domain 14, which consume capacity of the resource 11. While 2 VMs and 1 driver domain are shown for simplicity in FIG. 1, any number of such VMs and driver domains may be implemented in a given system. A scheduler 15 may be provided for scheduling usage of the resource 111 for the various competing consumers. Resource 11 may comprise any shared resource that is used by VMs $13_1$ and $13_2$ and driver domain 14. As discussed further herein, an example of such a shared resource 11 is a central processing unit ("CPU"). Thus, resource 11 may comprise any number of CPUs. The term "CPU" is used broadly herein to refer to any processing logic for processing demands of a consumer's workload.

Additionally, system 10 comprises controller 12, embodiments of which are described further herein. Controller 12 controls (e.g., limits) access to resource 11 (e.g., CPU) by driver domain 14 on behalf of a given consumer, such as one or both of VMs $13_1$ and $13_2$. As described further below, embodiments of controller 12 are presented herein which are operable to control an amount of resource usage by driver domain 14 on behalf of a given VM, such as VM $13_1$ or $13_2$. In this example, controller 12 is shown as implemented within driver domain 14 for controlling the amount of usage of resource 11 by driver domain 14 on behalf of a given VM. In other embodiments, controller 12 may be implemented external to driver domain 14, and in certain embodiments may be implemented as part of scheduler 15 for example.

As described further herein, driver domain 14 comprises a device driver that may be used by VMs $13_1$ and $13_2$ for accessing a shared resource. For instance, driver domain 14 may be a network driver domain that comprises a device driver for a network interface, which VMs $13_1$ and $13_2$ may use to access a communication network. Such a device driver may thus use a shared resource 11 (e.g., CPU) for servicing the requests of the VMs $13_1$ and $13_2$. Accordingly, as described further herein, a corresponding amount of resource usage by the driver domain 14 on behalf of a VM may be attributed to such VM. In general, an amount of resource usage by the driver domain 14 is considered as being "on behalf" of a given VM when the resource usage by the driver domain 14 is incurred for servicing demands of the given VM. Embodiments of controller 12 enable an amount of usage of resource 11 by driver domain 14 on behalf of a given VM to be controlled (e.g., limited). It should be recognized that in many instances it may be desirable to limit the amount of resource usage by a driver domain 14 on behalf of a given VM. Certain embodiments of controller 12 enable such an amount of resource usage by a driver domain 14 on behalf of a given VM to be controllably limited.

As described further herein, in certain embodiments, scheduler 15 may be implemented as an aggregate proportional-share scheduler that schedules access to resource (e.g., CPU) 11 for the VMs and driver domain(s) of the system. The aggregate proportional-share scheduler may take into consideration not only the resource usage of an individual VM, but also the resource usage of driver domain 14 that is attributable to the VM, for scheduling resource access for the VM. That is, such an aggregate proportional-share scheduler may consider an aggregate of resource usage attributable to a given VM, including resource usage of driver domain 14 that is attributable to the given VM, in scheduling shares of resource access to the given VM in proportion to the respective weight assigned to the given VM.

An exemplary aggregate proportional-share scheduler that may be used to scheduling resource access based on an aggregate of resource usage by a VM and by a driver domain on behalf of the VM is described further in concurrently filed and commonly assigned U.S. patent application Ser. No. 11/493,250 titled "SYSTEM AND METHOD FOR CONTROLLING AGGREGATE CPU USAGE BY VIRTUAL MACHINES AND DRIVER DOMAINS", the disclosure of which is incorporated herein by reference. It should be recognized that because such an aggregate scheduler may consider an aggregate resource usage (e.g., CPU usage) by a VM and by a driver domain in scheduling resource access to the VM, the amount of resource access scheduled for the VM may be undesirably limited due to excessive use of the resource by the driver domain on behalf of the VM. In other words, the amount of resource usage scheduled for direct usage by the VM may be undesirably limited by the aggregate proportional-share scheduler because of an excessive amount of indirect resource usage on behalf the VM by a driver domain. Thus, this is one example as to why it may be desirable to control an amount of resource usage by a driver domain on behalf of a given VM. Other scenarios may exist in a given system for which it may be desirable to controllably limit the amount of resource usage by a driver domain on behalf of a given VM. Of course, embodiments of the controller 12 described herein may be employed independent of and irrespective of the type of scheduling that may be employed in a system. Thus, while use of controller 12 in a system that employs an aggregate proportional-share scheduler provide an example of a system in which such controller may be beneficially utilized, utilization of embodiments of such controller 12 are not limited to systems that employ aggregate proportional-share schedulers, but instead embodiments of controller 12 may be employed to advantageously control an amount of resource usage by a driver domain on behalf of a given VM irrespective of the scheduler employed by the system.

As described above, virtualization enables resources to be shared between a plurality of VMs. A VMM is a software layer that virtualizes the available resources of a computer system and multiplexes them among one or more guest OSs on the computer system. As used herein, the term guest operating system refers to one of the OSs that the VMM can host, and the term domain refers to a running virtual machine within which a guest OS executes. Thus, the terms virtual machine (VM) and domain are used interchangeably herein. A privileged management domain refers to a domain that manages the creation and/or termination of other guest domains and may manage other parameters, such as CPU scheduling parameters, resource allocation policies, etc. A driver domain refers to a domain in which a device driver for one or more shared resources resides. An isolated driver domain refers to a domain in which a device driver is placed such that failure of the device driver does not interrupt any other domains in the system. The VMM may be referred to as a hypervisor because it operates at a higher privilege level than the supervisor code of the guest OSs that it hosts. Thus, the terms VMM and hypervisor are used interchangeably herein.

Typically, VMMs are classified into two groups: 1) "Type I VMMs" that run directly on physical hardware and thus provide an abstraction that is identical to the hardware underneath the VMM, such as IBM's VM/370; and 2) "Type II VMMs" that run as an application on a host operating system, such as user-mode Linux. Type I and Type II machines are available in the art. For instance, VMWare, Inc. provides both types of VMMs. In a traditional Type I VMM, the exposed virtual hardware functionality is identical to the underlying machine. This "full virtualization" has the main benefit of allowing unmodified OSs to be hosted. However, support for full virtualization was never a part of prevalent IA-32 (e.g., x86) architecture, and the efficient virtualization is difficult, i.e., it can be only achieved at the cost of increased complexity and reduced performance.

Several aspects of virtualization make it difficult or slow for a VMM to provide an interface that is identical to the physical hardware. For instance, some architectures include instructions whose behavior depends on whether the CPU is running in privileged or user mode (sensitive instructions), yet which can execute in user mode without causing a trap to the VMM. Virtualizing these sensitive-but-unprivileged instructions generally requires binary instrumentation, which adds significant complexity and may add significant overhead. For example, VMware's ESX Server dynamically rewrites portions of the hosted machine code to insert traps wherever VMM intervention might be required. In addition, emulating I/O devices at the low-level hardware interface (e.g. memory-mapped I/O) causes execution to switch frequently between the guest OS accessing the device and the VMM code emulating the device. To avoid the overhead associated with emulating a low-level device interface, most VMMs encourage or require the user to run a modified version of the guest OS. For example, the VAX VMM security kernel, VMware Workstation's guest tools add special drivers in the guest OS to accelerate the virtualization of some devices.

Another virtualization technique, called paravirtualization, has been recently introduced, that avoids the drawbacks of full virtualization by presenting a virtual model machine abstraction that is similar but not identical to the underlying hardware. This technique provides improved performance, but it also requires modification to the guest OSs, i.e. the commodity system needs to be ported to a paravirtualized environment. Xen™ is an example of a known VMM for x86 based on the paravirtualization technique, which supports execution of multiple guest OSs and that does not require changes to the application binaries interfaces (ABI), and hence no modifications are required to guest applications. Xen is an open source VMM, and the latest stable release of Xen is version 3.0.1, which is available as of the filing of this application at http://www.cl.cam.ac.uk/Research/SRG/netos/xen/downloads.html. In certain virtualization techniques, device drivers for shared resources are located in a privileged management domain, and thus to access those shared resources the virtual machines communicate with such privileged management domain. Further, in certain virtualization techniques, device drivers for shared resources are located in an isolated driver domain to improve dependability, maintainability, and manageability of the shared resources.

Figure 2A:
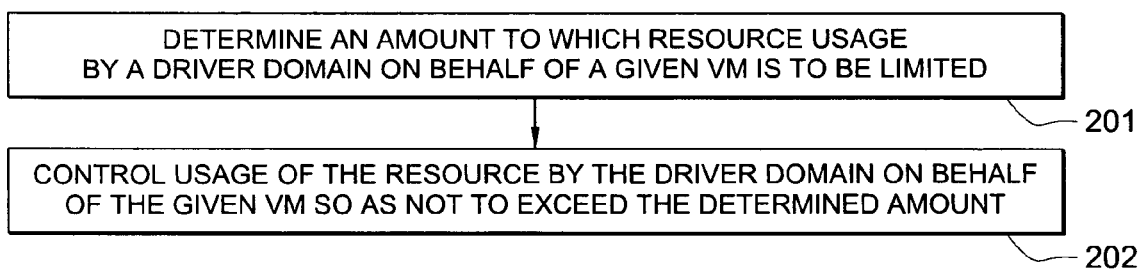
FIGS. 2A-2B show exemplary operational flows according to certain embodiments of the present invention.

For various reasons, it may be desirable to controllably limit an amount of CPU utilization by a driver domain, such as an isolated driver domain (IDD) on behalf of a given VM. Turning to FIG. 2A, an exemplary operational flow diagram according to one embodiment of the present invention is shown. In operational block 201, controller 12 determines an amount to which resource usage by a driver domain 14 on behalf of a given VM (e.g., VM $13_1$) is to be limited. As described further herein, such amount may be determined from user input and/or as a function of a predefined limit on an aggregate amount of resource usage attributable to the given VM, as examples. In operational block 202, controller 12 controls usage of the resource by the driver domain on behalf of the given VM so as not to exceed the determined amount. That is, in block 202 controller 12 controls the amount of resource usage that the driver domain uses on behalf of the given VM so that the amount does not exceed the amount determined in block 201.

In certain embodiments, a limit on the total amount of resource usage to be scheduled during any given scheduling interval for a driver domain 14 may be defined. For instance, a weighted proportional-share scheduler (e.g., scheduler 15) may, during a given scheduling interval, schedule a share of resource usage for the driver domain 14 in proportion to a pre-defined weight assigned to the driver domain 14. For instance, suppose that VMs $13_1$, $13_2$, and driver domain 14 are weighted equally such that they each should receive equal shares of CPU, say a 30% share each scheduling interval. In this manner, a scheduler may have scheduling intervals of 100 milliseconds (ms) each, for example, wherein the scheduler will schedule 30 ms of CPU access to each of VMs $13_1$, $13_2$, and driver domain 14 during each scheduling interval. In this manner, the scheduler 15 attempts to fairly allocate CPU capacity to the VMs and driver domain in proportion to their respective weights, which are equal in this example.

Further, according to certain embodiments of the present invention, the amount of resource usage (e.g., CPU usage) that may be scheduled for the driver domain on behalf of a given VM may be further limited. For instance, while in the above example the total share of CPU that may be scheduled for the driver domain 14 in any given scheduling interval may be 30 ms, the amount of such CPU usage by the driver domain 14 on behalf of a given VM may be limited to some amount less than 30 ms. For example, the amount of CPU that may be scheduled for the driver domain 14 to use on behalf of VM 13$_1$ may be limited to, say, 10 ms in any given scheduling interval. Thus, while the driver domain 14 may receive a total of 30 ms share of each 100 ms scheduling interval, in this example, the amount of CPU usage by driver domain 14 on behalf of VM 13$_1$ may be limited (e.g., by controller 12) to 10 ms.

Figure 2B:
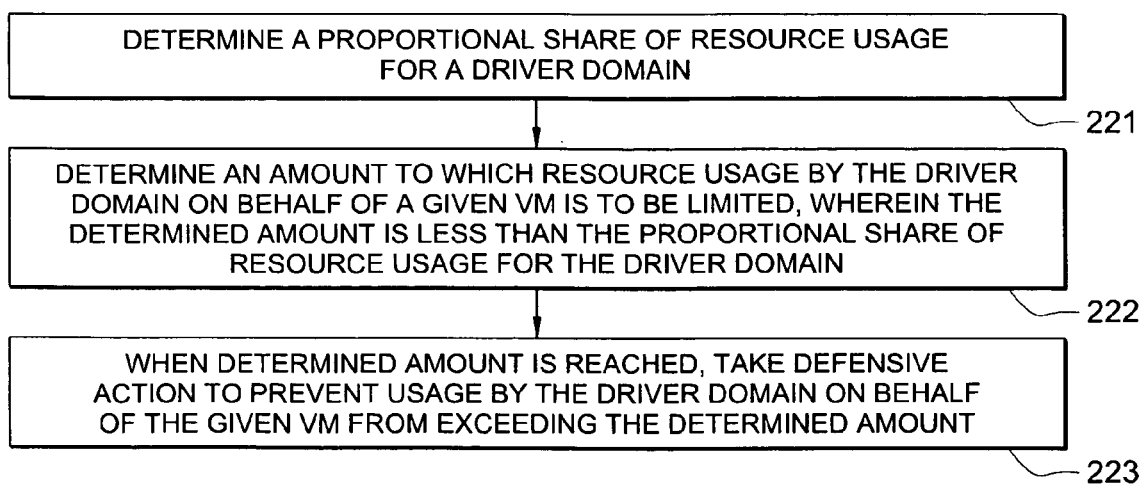

Thus, FIG. 2B shows another exemplary operational flow according to certain embodiments of the present invention. In block 221, scheduler 15 determines a proportional share of resource usage for a driver domain during a given scheduling interval. For instance, in the above example, the determined proportional share of CPU usage by driver domain 14 is 30% of a given scheduling interval (e.g., 30 ms of a 100 ms scheduling interval). In block 222, controller 12 determines an amount to which resource usage by the driver domain 14 on behalf of a given VM is to be limited, wherein the determined amount is less than the proportional share of resource usage scheduled for the driver domain. For instance, in the above example, the resource usage by driver domain 14 on behalf of VM 13$_1$ is limited to 10 ms, which is less than the driver domain's proportional share of 30 ms of a 100 ms scheduling interval. In operational block 223, when the determined amount (to which resource usage by the driver domain on behalf of a given VM) is reached during a given scheduling interval, controller 12 takes defensive action(s) to prevent further resource usage by the driver domain on behalf of the given VM during the given scheduling interval so that the determined amount is not exceeded. Thus, usage of the resource by the driver domain 14 on behalf of the given VM can be controlled so as not to exceed the amount determined in block 222. That is, the amount of resource usage (e.g., CPU usage) by the driver domain 14 on behalf of a given VM is controllably limited by the controller 12.

As described further hereafter, in certain embodiments, scheduler 15 is implemented as an aggregate proportional-share CPU scheduler. For various reasons, including without limitation management of resource allocation, it is often desirable to monitor the CPU utilization that is attributable to each of the VMs that may be implemented on a system. Traditional monitoring systems typically report the amount of CPU allocated by the scheduler for execution of a particular VM over time. However, this method often fails to reveal the "true" usage of the CPU by different VMs. For instance, in certain virtualization techniques, device drivers for shared resources are located in isolated driver domains, and thus to access those shared resources the VMs communicate with such isolated driver domains. Accordingly, the isolated driver domains use the CPU in processing the access requests received from the VMs. The CPU utilization of the isolated driver domains in servicing the requests of each VM (requesting to access a resource) are not attributed to the corresponding VMs in the traditional technique of monitoring VM CPU utilization (i.e., as those techniques report the amount of CPU allocated to a VM by the scheduler). Thus, the full CPU utilization of the VMs, including the corresponding isolated driver domain CPU utilization, is not determined.

For example, virtualization of input/output (I/O) devices results in an I/O model where the data transfer process involves additional system components, such as an isolated driver domain in which device drivers for the I/O resources reside. Hence, the CPU usage when the isolated driver domain handles the I/O data on behalf of a particular VM should be charged to the corresponding VM. However, simply monitoring the CPU utilization allocated by the scheduler to the corresponding VM fails to account for the CPU utilization of the isolated driver domain in handling the I/O data on behalf of such corresponding VM. Thus, the traditional technique of determining CPU utilization of each VM does not fully capture the CPU utilization attributable to a VM, as it fails to account for the corresponding isolated driver domain CPU utilization that is performed for each VM.

Certain techniques for observing communication between a VM and an isolated driver domain and attributing to the VM corresponding CPU usage of the isolated driver domain are described in co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. Certain embodiments presented therein attribute such CPU usage of an isolated driver domain to a corresponding VM based on a memory page exchange count. While such usage of memory page exchange count may provide a good estimate, it may introduce some inaccuracy due, for example, to the specific memory page exchange procedure employed by the VMM. For instance, often the VMM commercially known as Xen-3™ opportunistically performs additional memory page exchanges in order to keep a sufficient pool of memory pages in an isolated driver domain. Due to Direct Memory Access (DMA), some of the I/O data from a VM can be directly written to memory in an isolated driver domain ("IDD").

Certain embodiments of concurrently filed and commonly assigned U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", the disclosure of which is incorporated herein by reference, provide a more accurate technique for observing communication between a VM and a network driver domain (e.g., an isolated network driver domain ("net-IDD")) and attributing to the VM corresponding CPU usage of the network driver domain, by observing the amount of communication flowing through a virtualized interface between such VM and the network driver domain. That is, in U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE" exemplary systems and methods are disclosed for observing an amount of communication through a virtualized interface between a VM and a network driver domain and determining from such observed amount of communication a corresponding amount of the network driver domain's CPU utilization that is attributable to the VM. Thus, a corresponding amount of a network driver domain's CPU utilization to attribute to a VM may be computed based on an amount of communication (e.g., number of network packets) observed through the virtualized interface between the VM and the network driver domain.

In some instances, however, the amount of CPU utilization of a network driver domain may not correspond equally to the amount of communication between the VM and the network driver domain. Rather, the amount of CPU utilization of the network driver domain may differ depending on certain characteristics of the communication. For instance, in some systems the amount of CPU utilization of the network driver domain may differ for different sized packets. Additionally or alternatively, the amount of CPU utilization of the network driver domain may differ between packets received from a VM directed to the network driver versus packets from the communication network directed to the VM. Thus, certain embodiments of concurrently filed and commonly assigned U.S. patent application Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, provide an even further accurate technique attributing a network driver domain's CPU usage to a corresponding VM. In such further accurate technique, a "weighted" amount of communication observed through a virtualized interface between a VM and a network driver domain is determined, wherein such weight is determined at least in part on certain characteristics of the observed communication, such as the size of the observed packets and/or the direction of the packets along a communication path. The "weighted" amount of communication observed may then be used for more accurately determining a corresponding amount of CPU utilization by the network driver domain to attribute to the VM.

Concurrently filed and commonly assigned U.S. patent application Ser. No. 11/493,348 titled "SYSTEM AND METHOD FOR CONTROLLING AGGREGATE CPU USAGE BY VIRTUAL MACHINES AND DRIVER DOMAINS", the disclosure of which is incorporated herein by reference, describes exemplary embodiments of an aggregate proportional-share scheduler. Such embodiments of the aggregate proportional-share scheduler may employ any of the above-identified techniques, or any other technique now known or later developed, for attributing CPU usage of a driver domain to a corresponding VM that caused such CPU usage by the driver domain. Once an amount of CPU usage of a driver domain that is attributable to a VM is determined, the aggregate proportional-share scheduler may schedule CPU access to the VM based on the aggregate CPU usage attributable to such VM (e.g., both the VM's direct CPU usage and the CPU usage of a driver domain attributable to the VM). Thus, the aggregate proportional-share scheduler may schedule CPU usage for a VM so as to maintain the aggregate CPU usage that is attributable to the VM (i.e. both the VM's direct CPU usage and the CPU usage of a driver domain attributable to the VM) in proportion to the relative weight assigned to the VM. Thus, as the amount of CPU usage by the driver domain on behalf of the VM increases, the amount of CPU usage scheduled for direct usage by the VM may decrease to maintain the aggregate CPU usage attributable to the VM in proportion to the VM's respective weight.

Of course, it should be recognized that without some control over the amount of CPU usage of the driver domain on behalf of the VM, the driver domain may consume an excessive amount of CPU usage on behalf of the VM, thereby undesirably restricting the amount of CPU usage that may be scheduled for direct usage by the VM. For instance, again consider the above example wherein VMs $13_1$ and $13_2$ are weighted equally such that they each should receive equal shares of CPU, say a 30% share each scheduling interval. In this manner, an aggregate proportional-share scheduler may have scheduling intervals of 100 ms each, for example, wherein the scheduler will schedule CPU access to provide an aggregate of 30 ms of CPU access to each of VMs $13_1$ and $13_2$ for each scheduling interval. In certain embodiments of an aggregate proportional-share scheduler, the scheduler may subtract any amount of CPU usage in one scheduling interval by a driver domain on behalf of a given VM from an amount of CPU usage scheduled for the given VM in a next scheduling interval. For instance, continuing with the above example, suppose that in a first scheduling interval the scheduler schedules 30 ms of CPU usage for VM $13_1$ and also schedules 15 ms of CPU usage for driver domain 14 on behalf of VM $13_1$. In the second scheduling interval, the scheduler may subtract the 15 ms of "additional" CPU usage by driver domain 14 that was attributed to VM $13_1$ in the first interval from the 30 ms of CPU usage that would otherwise be scheduled for VM $13_1$ (i.e., the VM $13_1$'s proportional share) such that only 15 ms of CPU usage is scheduled for VM $13_1$ in the second scheduling interval. Suppose now that in a first scheduling interval the scheduler schedules 30 ms of CPU usage for VM $13_1$ and also schedules 30 ms of CPU usage for driver domain 14 on behalf of VM $13_1$. In the second scheduling interval, the scheduler may subtract the 30 ms of "additional" CPU usage by driver domain 14 that was attributed to VM $13_1$ in the first interval from the 30 ms of CPU usage that would otherwise be scheduled for VM $13_1$ (i.e., the VM $13_1$'s proportional share) such that no CPU usage is scheduled for VM $13_1$ in the second scheduling interval. In this manner, if the CPU usage by the driver domain 14 on behalf of VM $13_1$ is not limited, then the driver domain 14 may effectively starve the VM $13_1$ from receiving any direct CPU usage.

Thus, embodiments of the present invention may be employed to, for example, control the amount of CPU usage by a driver domain on behalf of a given VM. In this manner, when used in conjunction with an aggregate proportional-share scheduler, such as the embodiments of an aggregate proportional-share scheduled described in concurrently filed and commonly assigned U.S. patent application Ser. No. 11,493,348 titled "SYSTEM AND METHOD FOR CONTROLLING AGGREGATE CPU USAGE BY VIRTUAL MACHINES AND DRIVER DOMAINS", the amount of CPU usage by a driver domain on behalf of a given VM may be limited so as not to consume an undesirably large amount of the permitted aggregate amount of CPU usage attributable to the given VM. Of course, application of embodiments of the present invention are not limited for use in systems that employ an aggregate proportional-share scheduler, but rather those systems provide one example wherein an embodiment of controller 12 may be desired.

Figure 3:
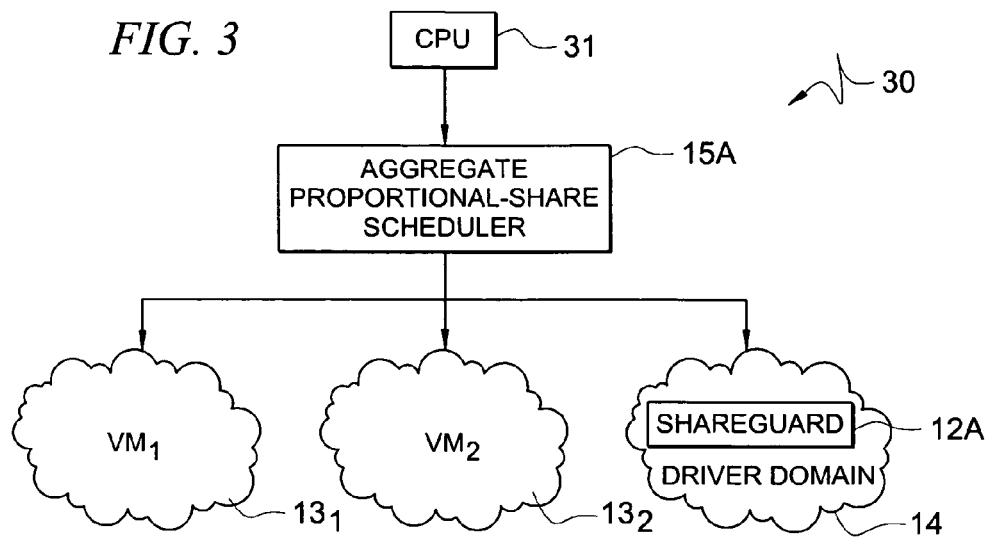
FIG. 3 shows an exemplary system according to one embodiment of the present invention.

FIG. 3 shows an exemplary system 30 according to one embodiment of the present invention. In the example of FIG. 3, scheduler 15 of FIG. 1 is implemented as an aggregate proportional-share scheduler 15A, such as the exemplary aggregate proportional-share scheduled described in concurrently filed and commonly assigned U.S. patent application Ser. No. 11/493,348 titled "SYSTEM AND METHOD FOR CONTROLLING AGGREGATE CPU USAGE BY VIRTUAL MACHINES AND DRIVER DOMAINS". In this example, controller 12 is implemented as "Shareguard" logic 12A within driver domain 14. Shareguard logic 12A may be implemented as a software application, hardware, firmware, or any combination thereof. An exemplary implementation of such Shareguard logic 12A is described further below. Also in this example, the shared resource (e.g., resource 11 of FIG. 1 is CPU 31, which may be one or more CPUs. Aggregate proportional-share scheduler 1 SA schedules access to CPU 31 for various consumers, such as VMs $13_1$ and $13_2$ and driver domain 14. Embodiments of aggregate proportional-share scheduler 15A take into consideration not only the CPU usage of an individual VM, but also the CPU usage of driver domain 14 that is attributable to the VM, for scheduling CPU access for the VM. That is, aggregate proportional-share scheduler 15A considers an aggregate of CPU usage attributable to a given VM, including CPU usage of driver domain 14 that is attributable to the given VM, in scheduling shares of CPU to the given VM in proportion to the respective weight assigned to the given VM.

As described further herein, Shareguard 12A is implemented to controllably limit an amount of CPU usage by driver domain 14 on behalf of a given VM. In this manner, the amount of a VM's aggregate CPU usage that is attributable to usage by a driver domain on behalf of the VM is controllably limited so as to permit a desired amount of CPU usage to be available for direct use by the VM.

Figure 4:
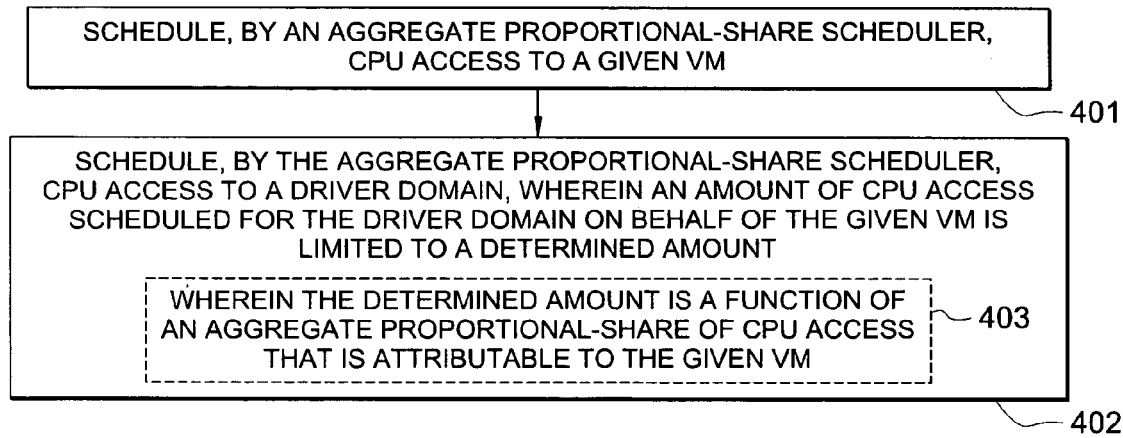
FIG. 4 shows an operational flow diagram of one embodiment of the present invention.

Turning to FIG. 4, an operational flow diagram of one embodiment of the present invention is shown. In operational block 41, an aggregate proportional-share scheduler 15A schedules CPU access to a given VM, such as VM $13_1$ of FIG. 3. In operational block 402, the aggregate proportional-share scheduler 15A schedules CPU access to a driver domain 14, wherein an amount of CPU access by the driver domain on behalf of the given VM is limited (e.g., by Shareguard logic 12A) to a determined amount. As shown in block 403, in certain embodiments, the determined amount to which the CPU access by the driver domain on behalf of the given VM is limited is determined as a function of an aggregate proportional share of CPU access that is attributable to the given VM. For instance, suppose as in the above examples that the weighting assigned to VM $13_1$ dictates that its aggregate proportional share of CPU is 30% of a scheduling interval (e.g., 30 ms of a 100 ms scheduling interval); in such an example, the amount of CPU access scheduled for the driver domain 14 on behalf of VM $13_1$ may be limited (by Shareguard logic 12A) to no more than 50% of the aggregate proportional share of CPU for VM $13_1$, which is 15% (or 15 ms of a 100 ms scheduling interval) in this example. In certain embodiments provided herein, a user (e.g., system administrator) may define the amount to which the CPU access by a driver domain on behalf of a given VM is to be limited (e.g., a user may specify that the amount of CPU access by the driver domain on behalf of VM $13_1$ is to be limited to no more than 50% of the aggregate proportional share of CPU for VM $13_1$ in the above example). For example, in certain embodiments, controller 12 (e.g., Shareguard 12A) may provide a user interface that enables a user to input information defining such limit on the amount of CPU by a driver domain in any scheduling interval on behalf of a given VM.

Figure 5:
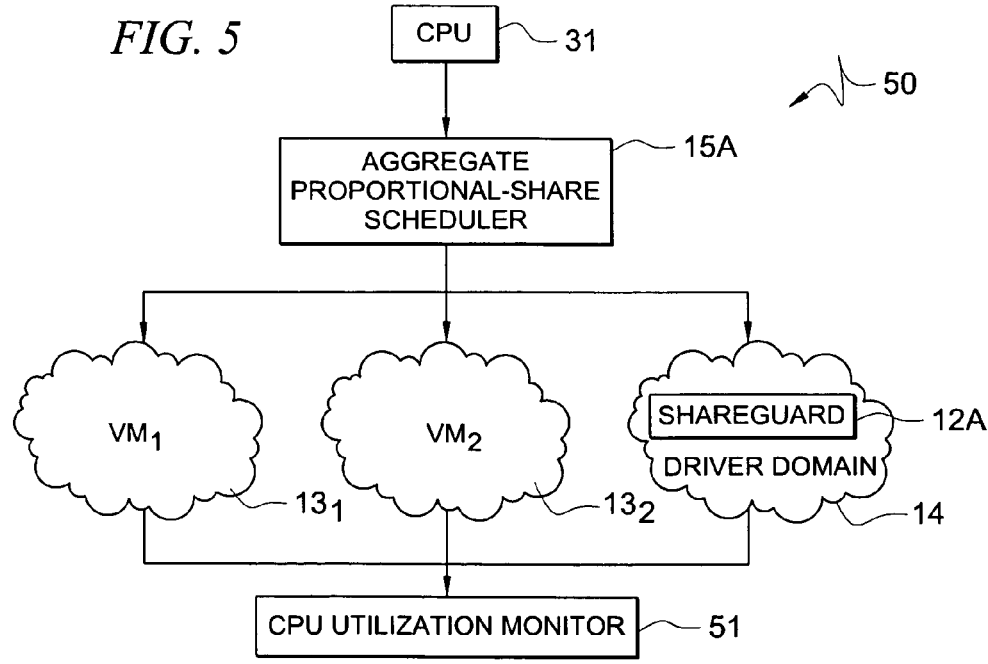
FIG. 5 shows another exemplary system employing an embodiment of the present invention.

FIG. 5 shows another exemplary system 50 employing an embodiment of the present invention. As shown, as with FIG. 3, FIG. 5 includes aggregate proportional-share scheduler 15A that is operable to schedule access to CPU 31 for various consumers, such as VMs $13_1$ and $13_2$ and driver domain 14. Driver domain 14 is adapted to include Shareguard 12A to controllably limit an amount of CPU usage by such driver domain 14 on behalf of a given VM. In the exemplary system 50 of FIG. 5, a CPU utilization monitor 51 is included, which is operable to monitor CPU usage of driver domain 14 and attribute the CPU usage of the driver domain 14 to the corresponding VM that caused such CPU usage. That is, driver domain 14 may consume CPU capacity on behalf of a given VM (e.g., for performing tasks requested by a given VM), up to the limit enforced by Shareguard 12A, and CPU utilization monitor 51 may attribute such CPU utilization of the driver domain 14 to the given VM. CPU utilization monitor 51 may employ the techniques described in any of the following co-pending U.S. Patent Applications, as examples, for attributing CPU utilization of the driver domain 14 to the corresponding VM: 1) U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", 2) concurrently filed U.S. patent application Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", and 3) concurrently filed U.S. patent application Ser. No. 11/493, 492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosures of which are incorporated herein by reference. Of course, other techniques now known or later developed for attributing CPU utilization of a driver domain to a corresponding VM may be employed by CPU utilization monitor 51 in other embodiments.

Thus, as shown in FIG. 5, CPU utilization monitor 51 may determine an aggregate amount of CPU usage for each of VMs $13_1$ and $13_2$, including their respective attributed CPU usage by driver domain 14. Aggregate proportional-share CPU scheduler 15A may then use the determined aggregate amount of CPU usage determined by CPU utilization monitor 51 for managing its scheduling of CPU access for the VMs $13_1$ and $13_2$ and/or driver domain 14 to maintain the aggregate CPU usage of each VM in proportion to its respective assigned weight. Again, as described further herein, Shareguard logic 12A controllably limits an amount of CPU usage by driver domain 14 on behalf of a given VM. In this manner, the amount of a VM's aggregate CPU usage that is attributable to usage by a driver domain on behalf of the VM is controllably limited so as to permit a desired amount of CPU usage to be available for direct use by the VM.

Figure 6:
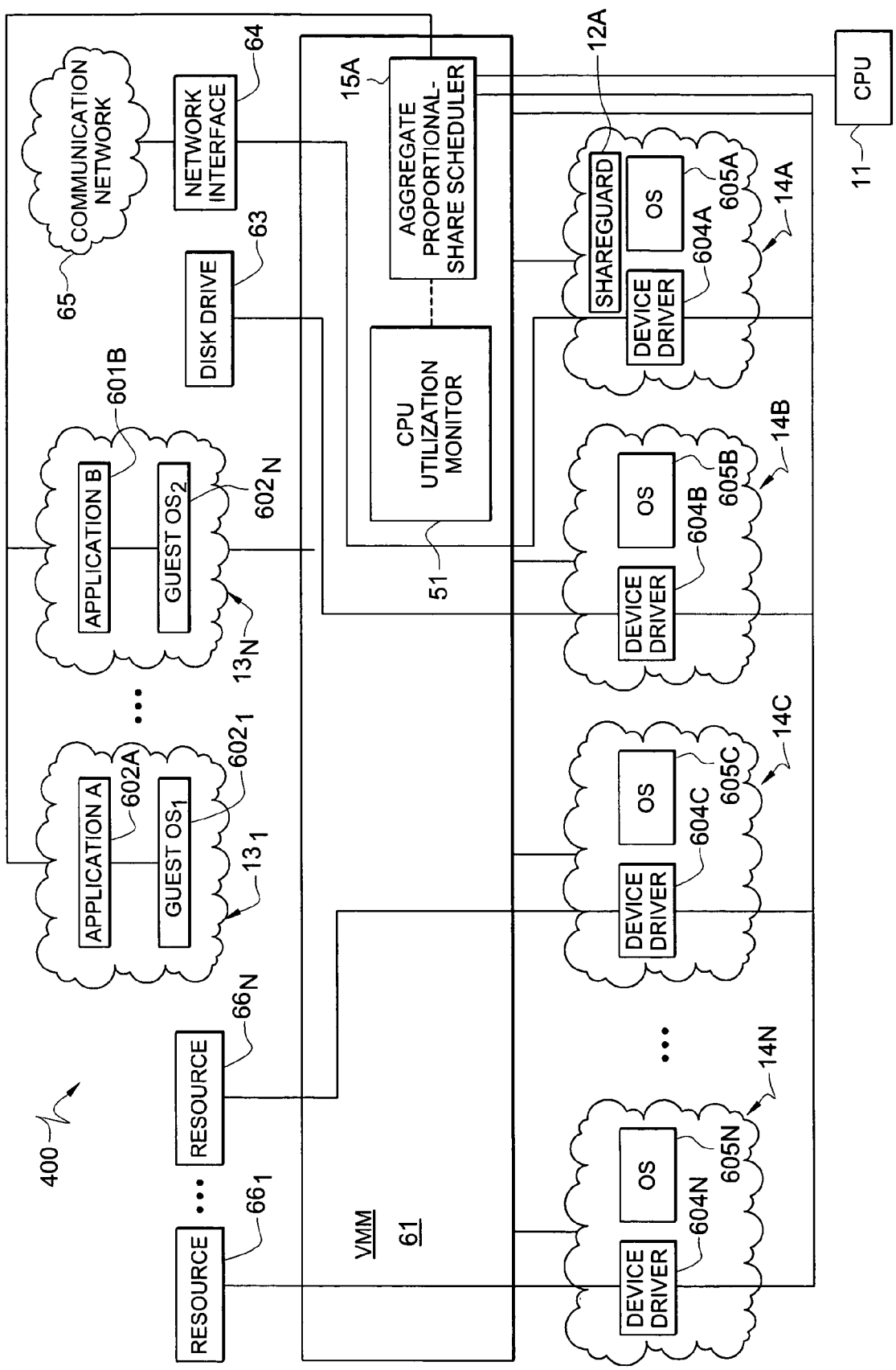
FIG. 6 shows an exemplary virtualized system in which an embodiment of Shareguard logic is employed according to one embodiment of the present invention.

FIG. 6 shows an exemplary virtualized system in which an embodiment of Shareguard logic 12A is employed. As shown, computer system 600 has any number "N" of VMs or "domains" $13_1, \ldots, 13_N$ implemented thereon (referred to collectively as VMs 13). Such virtualization may be achieved utilizing any suitable technique now known or later discovered. Within each VM 13, a guest OS is executing, such as guest $OS_1$ $602_1$ in VM $13_1$ and guest $OS_N$ $602_N$ in VM $13_N$. Further, one or more applications may be executing within each VM 13, such as application A 601A in VM $13_1$ and application B 601B in VM $13_N$. VMM 61 is implemented, which is a software layer that virtualizes the available resources of computer system 600 and multiplexes them among the various VMs 13 (e.g., the various guest OSs) on the computer system.

System 600 further includes CPU 11, and various shared resources of which VMM 61 manages access by the various VMs 13. The system's shared resources include I/O resources, such as disk drive 63 (e.g., hard drive, floppy drive, tape drive, optical drive, SCSI interface, IDE, etc.) and network interface 64 (e.g., any of a variety of different network interface cards (NICs) and/or adapters), which enables system 600 to interface to communication network 65 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $66_1, \ldots, 66_N$ to which VMM 61 manages access of the VMs 13, examples of which include without limitation memory (e.g., RAM) and block data storage (e.g., disks).

Any number of driver domains, such as driver domains 14A-14N (referred to collectively as driver domains 14), may also be included, each of which contain device drivers for certain ones of the shared resources. In certain embodiments, driver domains 14 may each be an isolated driver domain. In the illustrated example, device drivers 604A-604N (referred to collectively as device drivers 604) are included in domains 14A-14N, respectively, for supporting access to disk drive 63, network interface 64, and resources $66_1, \ldots, 66_N$. In the example shown, device driver 604A for accessing network interface 64 resides in driver domain 14A; device driver 604B for accessing disk drive 63 resides in driver domain 14B; device driver 604C for accessing resource $66_N$ resides in driver domain 14C; and device driver 604N for accessing resource $66_1$ resides in driver domain 14N. In this exemplary virtualized system 600, the VMs 13 communicate (e.g., through a virtualized interface supported by VMM 61) to driver domain 14A for accessing network interface 64, to driver domain 14B for accessing disk drive 63, to driver domain 14C for accessing shared resource $66_N$, and to driver domain 14N for accessing shared resource $66_1$. Each of the driver domains 14 also includes an OS 605, such as OS 605A in driver domain 14A, OS 605B in driver domain 14B, OS 605C in driver domain 14C, and OS 605N in driver domain 14N.

As described above, VMM 61 is a software layer that is commonly implemented in virtualization architectures, which virtualizes the available resources of computer system 600 and multiplexes them among the various VMs 13. Thus, to access certain resources, the VMs 13 communicate via the VMM 61 to the driver domains 14 (e.g., either directly, as in a paravirtualized system, or via the VMM intercepting communication of the VMs, as in many fully-virtualized systems). That is, in certain implementations, the system is paravirtualized, in which the guest OS of each VM 13 is adapted in some manner to communicate with VMM 61. In other implementations, the guest OSs may not be so adapted, but instead the VMM 61 may act to intercept certain resource accesses attempted by the guest OSs, in which case embodiments of the present invention may be employed for any such virtualized system (e.g., fully-virtualized or paravirtualized system).

In certain embodiments, the driver domains 14 are implemented as isolated driver domains (IDDs), which isolate failure of a given driver from causing a failure of any other domains (other driver domains, guest domains (e.g., VMs), etc.). Recent studies show that device drivers are frequently responsible for operating system failures. For example, a study from Stanford university found that the Linux drivers have 3 to 7 times the bug frequency as the rest of the OS. Similarly, product support calls for Windows 2000 showed that device drivers accounted for 27% of crashes compared to 2% for kernel support. Device drivers can be viewed as a type of kernel extensions, added after the fact. Commercial operating systems are typically extended by loading unsafe object code and linking it directly with the kernel. To reduce the risk of device misbehavior and to address problems of dependability, maintainability, and manageability of I/O devices, the Xen-3™ virtualization system available from Hewlett-Packard Company uses the complete original OS itself as the compatibility wrapper for a device driver. The original OS effectively becomes an execution container for the driver. Thus, the exemplary system 400 may include IDDs 14, which include device drivers residing therein. In such an implementation, the device drivers may run unmodified in privileged guest OSs. An IDD in which a device driver for supporting access to a communication network may be referred to as a net-IDD herein.

As shown in FIG. 6, a CPU utilization monitor 51 may be implemented that determines, for each of the VMs 13, a corresponding amount of CPU utilization of driver domains 14 that is attributable to such VM 13. Aggregate proportional-share scheduler 15A may take into consideration the aggregate CPU usage of each of VMs 13, including the corresponding amount of CPU usage of driver domains 14 attributable to each VM, for scheduling CPU usage for such VMs 13, as described further herein. Additionally, as described further herein, Shareguard logic 12A is implemented to controllably limit the amount of CPU usage by a driver domain on behalf of a given VM. In this example, Shareguard logic 12A is employed for IDD 14A for controllably limiting the amount of CPU usage by the network device driver 604A on behalf of a given VM. Of course, the Shareguard logic 12A may be likewise employed instead or in addition within any of the other IDDs 14. Further, a different limit on the amount of CPU usage by the IDD 14A may be defined for each of the VMs 13. That is, a first limit on the amount of CPU usage by IDD 14A on behalf of VM $13_1$ may be defined (e.g., by a user), and a different amount of CPU usage by IDD 14A on behalf of VM $13_N$ may be defined. As discussed above, in certain embodiments, the respective limits for each VM may be defined as a function of their respective aggregate proportional shares of CPU access.

Various types of weighted proportional-share CPU schedulers are known, and any weighted proportional-share scheduler now known or later developed may be adapted in order to implement aggregate proportional-share scheduler 15A for scheduling CPU access for VMs based on an aggregate of CPU usage attributable to each VM. As one example, an embodiment that adapts the well-known Simple Earliest Deadline First (SEDF) scheduler for implementing aggregate proportional-share scheduler 15A is described further in concurrently filed and commonly assigned U.S. patent application Ser. No. 11/493,348 titled "SYSTEM AND METHOD FOR CONTROLLING AGGREGATE CPU USAGE BY VIRTUAL MACHINES AND DRIVER DOMAINS", the disclosure of which is incorporated herein by reference. An exemplary adapted SEDF scheduler described therein is referred to as SEDF-Debt Collector (or "SEDF-DC"). The exemplary SEDF-DC scheduler is operable to allocate combined X % CPU share to a particular $VM_i$ over time such that $X=X_i+Y_k$, where $X_i$ is CPU usage by $VM_i$ and $Y_k$ is CPU usage by $IDD_k$ as a result of I/O processing on behalf of the guest domain $VM_i$.

FIG. 7 shows an exemplary scheduling scenario according to one embodiment of the present invention. In this example, 6 scheduling intervals, which may be 100 ms each for example, are shown. The graph of FIG. 7 shows an amount of the scheduling interval that is allocated by an embodiment of the aggregate proportional-share scheduler 15A to a given VM, $VM_1$. Suppose for this scenario that $VM_1$ is weighted such that its proportional share of each scheduling interval is 30% (i.e., 30 ms). Also shown in the graph of FIG. 7 is an amount of CPU scheduled for a driver domain 14 in each scheduling interval which is attributable to $VM_1$. In the exemplary scenario of FIG. 7, $VM_1$ is allocated a 30% share of scheduling interval 1. Additionally, during scheduling interval 1 driver domain 14 is allocated a 15% share that is attributable to $VM_1$ (e.g., driver domain 14 uses a 15% share of CPU in interval 1 on behalf of $VM_1$). Thus, $VM_1$ effectively receives an aggregate 45% share of CPU in interval 1, which exceeds its proportional share of 30%.

Accordingly, in the next scheduling interval, interval 2, the aggregate proportional-share scheduler 15A allocates a 15% share of the interval to $VM_1$. This, brings the overall CPU allocated to $VM_1$ over intervals 1 and 2 back to the 30% proportion. In interval 2, driver domain 14 receives no CPU allocation that is attributable to $VM_1$. So, in interval 3, the scheduler 15A allocates a 30% share to $VM_1$. Additionally, in interval 3 the scheduler allocates to driver domain 14 a 5% share that is attributable to $VM_1$. Because in interval 4 it is determined that $VM_1$ effectively received an additional 5% share of CPU usage in interval 3 (i.e., the 5% usage of driver domain 14 that is attributable to $VM_1$), the scheduler 15A adjusts the allocation of interval 4 to 25% for $VM_1$.

Additionally, in interval 4 a 10% share is scheduled for driver domain 14, which is attributable to VM1. Thus, because in interval 5 it is determined that $VM_1$ effectively received an additional 10% share of CPU usage in interval 4 (i.e., the 10% usage of driver domain 14 that is attributable to $VM_1$), the scheduler 15A adjusts the allocation of interval 5 to 20% for $VM_1$. In the exemplary scenario of FIG. 7, driver domain 14 is allocated no CPU that is attributable to $VM_1$ in interval 5, and thus in interval 6 the scheduler allocates the full proportional share (i.e., 30%) to $VM_1$.

As can be seen by the example of FIG. 7, in this embodiment, the aggregate proportional-share scheduler 15A adjusts the amount of CPU allocated to a given VM in one scheduling interval to account for any extra CPU utilized on behalf of the VM by a driver domain in a previous scheduling interval. That is, for each scheduling interval, the VM is allocated its proportional share minus any share of CPU usage of a driver domain in a previous scheduling interval that is attributable to the VM. Thus, in this exemplary embodiment, the aggregate proportional-share of a VM for a given scheduling interval is computed by subtracting any share of CPU usage of a driver domain in a previous domain that is attributable to the VM from the proportional share that the VM would otherwise receive for the given scheduling interval.

It should be recognized from the above exemplary embodiment of aggregate proportional-share scheduler 15A that CPU usage by a driver domain that is attributable to a VM may limit the amount of CPU scheduled for direct usage by the VM. For instance, in the above example if 30% CPU is scheduled in a first scheduling interval for a driver domain that is attributable to $VM_1$, then the scheduler will not schedule any CPU usage for $VM_1$ in the subsequent scheduling interval (because the 30% share of CPU usage of the driver domain in the previous interval is subtracted from the 30% proportional share that the $VM_1$ would otherwise receive, resulting in 0% of the subsequent scheduling interval). If the driver domain repeatedly utilizes a large amount of CPU on behalf of $VM_1$, then the above-described exemplary aggregate proportional-share scheduler may undesirably prevent the $VM_1$ from obtaining any direct CPU usage. Thus, certain embodiments of the present invention employ Shareguard logic 12A for limiting the amount of CPU usage of a driver domain on behalf of a given VM, thus ensuring that a minimum amount of the aggregate CPU attributable to the VM is available for the VM's direct usage.

Thus, as described above, an aggregate proportional-share scheduler, such as SEDF-DC, accounts for aggregate VM resource consumption in allocating CPU. Additionally, ShareGuard logic 12A is operable to limit the total amount of resources (CPU in the above example) consumed in a driver domain (e.g., privileged domain, isolated driver domain, etc.) based on administrator-specified limits. According to one embodiment, ShareGuard logic 12A provides a control mechanism that enforces a specified limit on CPU time consumed by a driver domain (e.g., an isolated driver domain in which a network driver resides, which may be referred to herein as a "net-IDD") on behalf of a particular guest domain (or "VM"). ShareGuard logic 12A is independent of the particular CPU scheduler 15 that may be employed, and hence may serve as a general mechanism to control the CPU consumed by driver domains on behalf of different guest domains.

An exemplary implementation of the ShareGuard logic 12A is described herein as targeting the Xen™ VMM and applications performing network I/O. However, embodiments of the ShareGuard logic 12A are not limited in this regard, but may generally be applied to other VMMs and/or other auxiliary resources, such as disk I/O. The SEDF-DC scheduler enables enforcement of limits on the total CPU utilization of a domain (its own and work done by IDDs on its behalf): restrict it to 50% for example. ShareGuard logic 12A enables the CPU overhead due to a guest within an IDD to be further controlled: for instance, a VM can be restricted from consuming more than 5% in the driver domain.

In the current Xen™ implementation, a driver domain does not control the amount of CPU it consumes for I/O processing on behalf of different guest domains. This lack of control during I/O processing may significantly impact the performance of network services running on the same physical host. Control is desired for an aggregate proportional-share scheduler, such as SEDF-DC, to be able to enforce combined, system-wide CPU usage. For example, a guest domain with a specified allocation of 5% for combined CPU usage should not be able to uncontrollably consume 50% of CPU resources through the driver domain, and thus adversely affect the performance of other domains.

An exemplary embodiment of ShareGuard logic 12A enforces a specified limit on CPU time consumed by a driver domain for I/O processing on behalf of a particular guest domain over time. In one embodiment, ShareGuard logic 12A periodically polls CPU utilization monitor 51 for CPU time consumed by IDDs on behalf of different guest domains. If a guest domain (or "VM") CPU usage is above the specified limit, then this exemplary embodiment of ShareGuard logic 12A "turns on" its defensive actions and stops network traffic to/from the corresponding guest domain.

To more formally describe an exemplary implementation of ShareGuard logic 12A, let the CPU requirement of netIDD be specified by a pair ($s^{IDD}$, $p^{IDD}$), meaning that netIDD will receive a CPU allocation of at least $s^{IDD}$ units of time in each period of length $p^{IDD}$. In other words, this specification is bounding CPU consumption of netIDD overtime to:

$$CPUshare^{IDD} = \frac{s^{IDD}}{p^{IDD}}.$$

Further, let $limit_i^{IDD}$ specify a fraction of CPU time in netIDD available for network processing on behalf of $Dom_i$ such that $limit_i^{IDD} < CPUshare^{IDD}$. If such a limit is not set, then $Dom_i$ is entitled to unlimited I/O processing in netIDD. It should be noted that in certain embodiments, ShareGuard logic 12A enables limits to be selectively defined for certain domains (or VMs) while allowing other domains to be unrestricted. Additionally, let t define the time period ShareGuard logic 12A uses to evaluates current CPU usage in netIDD and performs decision making, e.g. in one exemplary implementation of ShareGuard logic 12A t=500 ms.

Using CPU utilization monitor 31, this exemplary embodiment of ShareGuard logic 12A collects information on CPU usage by netIDD every t interval, and computes the fraction of overall CPU time used by netIDD for networking processing on behalf of $Dom_i$ ($1 \leq i \leq n$) during the latest t interval. This fraction is denoted as $used_i^{IDD}$.

In each time interval t, ShareGuard logic 12A determines the validity of the condition: $used_i^{IDD} \leq limit_i^{IDD}$. If this condition is violated, then $Dom_i$ has exhausted its CPU share for network traffic processing in netIDD. At this point, ShareGuard logic 12A applies the defensive actions for the next time interval $t_{def}$, where $$t^{def} = t \times int\left(\frac{used_i^{IDD} + 1}{limit_i^{IDD}}\right).$$

In this embodiment, ShareGuard logic 12A performs the following defensive actions;

a) Stop accepting incoming traffic to a domain. For netIDD's running Linux, Linux's advanced routing and traffic control mechanisms may be used to drop/reject traffic destined for a particular domain, for example. In particular, in certain embodiments, iptables may be used because they are configurable from user space. (See e.g., http://www.netfilter.org/.http://lartc.org/howto/). Similar techniques can be applied in other operating systems that may serve as wrappers for some other legacy device drivers, for example.

b) Stop processing outgoing traffic from a domain. As in the previous case, iptables may be used to drop packets being transmitted from a domain, for example. However, this will still incur substantial overhead in the IDD because iptables will only process the packet once it has traversed the network stack of the IDD. In many instances, it may be desirable to drop the packet before it even enters the IDD so that there is no overhead. One way of doing this is to enforce iptables filtering within the guest domain. However, in certain embodiments, ShareGuard logic 12A does not assume any cooperation from guests, and so such filtering within a guest domain may not be practical in those embodiments.

It should be noted that in certain embodiments, a virtualized back-end interface (referred to as the "netback driver" in Xen™) may be implemented within a net-IDD, through which all traffic between the net-IDD and VMs flows. Such a virtualized back-end interface provides an attractive control point within the net-IDD where packets can be dropped before entering the net-IDDs network stack. Such a virtualized back-end interface (e.g., netback) is described further in concurrently filed and commonly assigned U.S. patent applications: 1) Ser. No. 11/493,506 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", and 2) Ser. No. 11/493,492 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosures of which are incorporated herein by reference. In certain embodiments of the present invention, the ShareGuard logic 12A sends a notification to the virtualized back-end interface (e.g., "netback") of a driver domain identifying the target domain and the desired action (e.g., drop packets, forward packets, etc). This is akin to setting iptable rules, except that these rules will be applied within the virtualized back-end interface (e.g., netback) of the net-IDD.

Whenever netback receives an outbound packet from a domain (e.g., VM), it determines if there are any rules applicable to this domain. If so, netback takes the desired action according to the applicable rules (e.g. drop the packet instead of forwarding it to the actual device driver). This is both lightweight (in terms of overhead incurred by the IDD) and flexible (in terms of control exercised by the IDD).

After time interval $t^{def}$, ShareGuard logic 12A restores normal functionality in net-IDD with respect to network traffic to/from domain $Dom_i$.

With this exemplary embodiment of ShareGuard logic 12A, the net-IDD's CPU usage on behalf of different guest domains is strictly controlled: each guest domain is allowed to consume only a designated fraction of resources allocated to the net-IDD. Once this limit is reached, ShareGuard logic 12A "turns on" its preventive/defensive actions and stops network traffic to/from the corresponding guest domain.

Thus, as described above, a limit on the amount of CPU usage of a driver domain on behalf of a given VM may be defined, and upon that limit being reached, the ShareGuard logic 12A may take defensive actions to prevent further usage of CPU by the driver domain on behalf of the given VM. The defensive actions may be invoked for limiting CPU usage by the driver domain on behalf of the given VM during a given scheduling period, and thereafter the defensive actions may be turned off to enable usage of CPU by the driver domain on behalf of the given VM in a next scheduling period (up to the defined limit).

The promise of virtualized environment in the enterprise setting is its ability to "encapsulate" different applications in different virtual machines for availability and performance reasons. To evaluate the effectiveness of the above-described exemplary embodiment of ShareGuard logic 12A in such scenarios, we conducted a case study under the following experimental configuration: three virtual machines are sharing the same system. Domain-1 and Domain-2 host webservers that support business critical services. These services have well-defined expectations for their throughput and response time. The CPU shares for these domains are set to meet these expectations. Domain-3 hosts a batch-like application that does some computation and performs occasional bulk data transfers. This virtual machine supports a less important application that is not time-sensitive, but needs to complete its job eventually.

In a first experiment, overall performance of these three services was observed to see whether they can impact each others performance. A dual-processor machine was setup as follows: Domain-0 is running on a separate processor by itself and is restricted to consume at most 60% of the CPU. The second CPU hosts three VMs: Domain-1 and Domain-2 run webservers (serving 10 KB and 100 KB files respectively), and Domain-3 occasionally does a bulk file transfer. All of these VMs have equal share of the second CPU, i.e., 33% each.

In this experiment, a benchmark was started that loaded webservers in Domain-1 and Domain-2 from two separate machines using httperf for two minutes. Forty seconds into the benchmark, Domain-3 initiates a bulk-file transfer that lasts for 40 seconds.

Figure 8A:
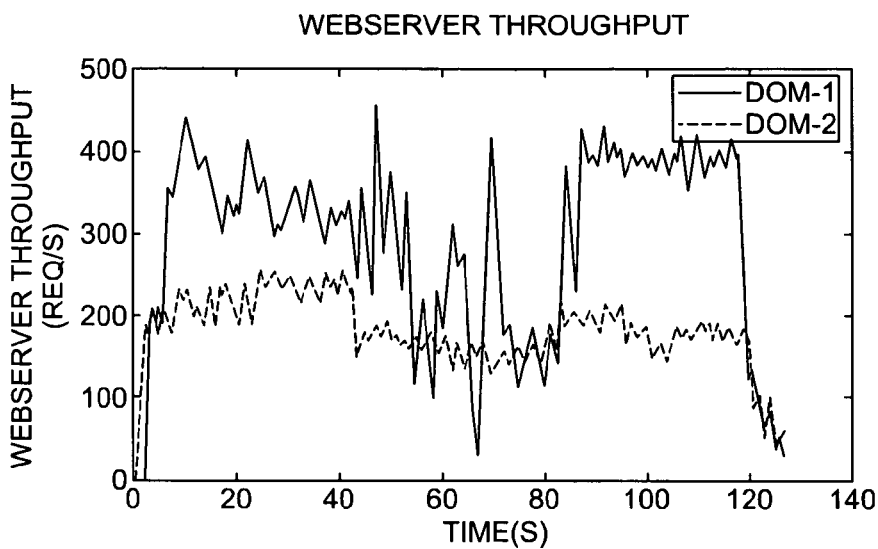
FIGS. 8A-8C show graphs illustrating results for an exemplary case study conducted without employing ShareGuard logic of an embodiment of the present invention.
Figure 8B:
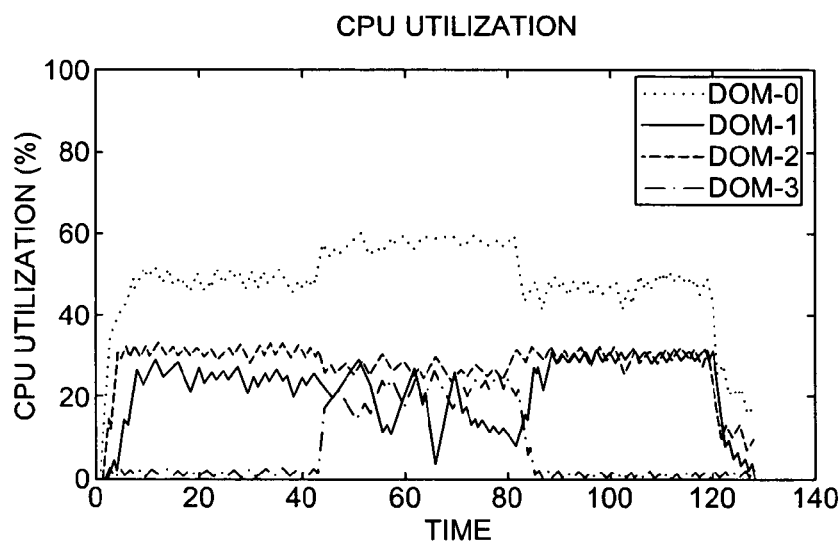
Figure 8C:
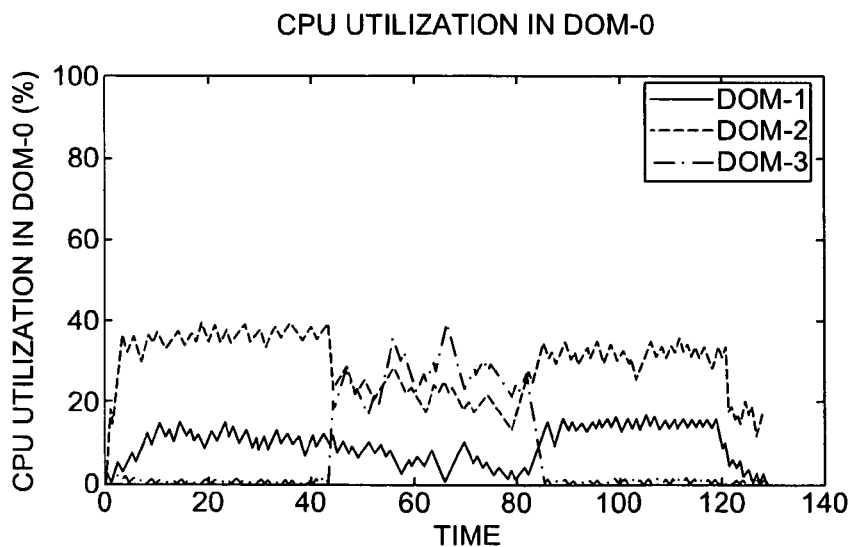
Figure 9A:
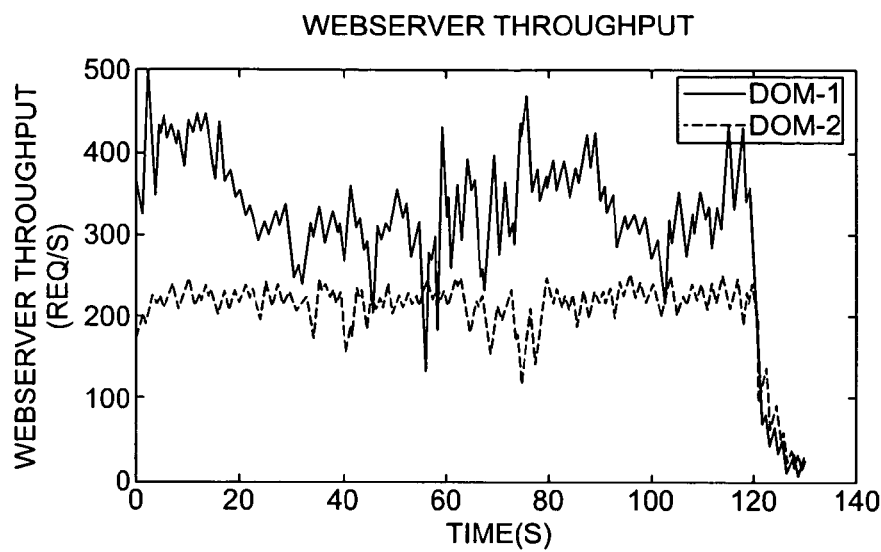
FIGS. 9A-9C show graphs illustrating results for an exemplary case study conducted when employing ShareGuard logic of an embodiment of the present invention.
Figure 9B:
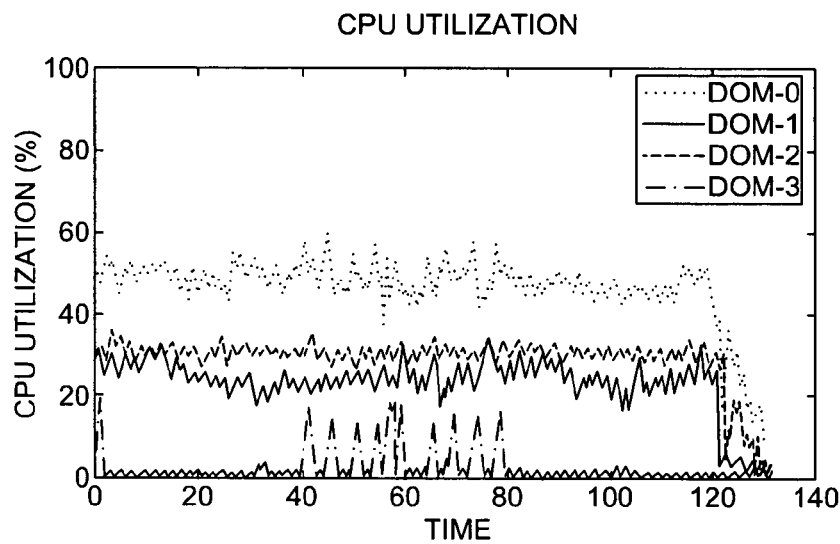
Figure 9C:
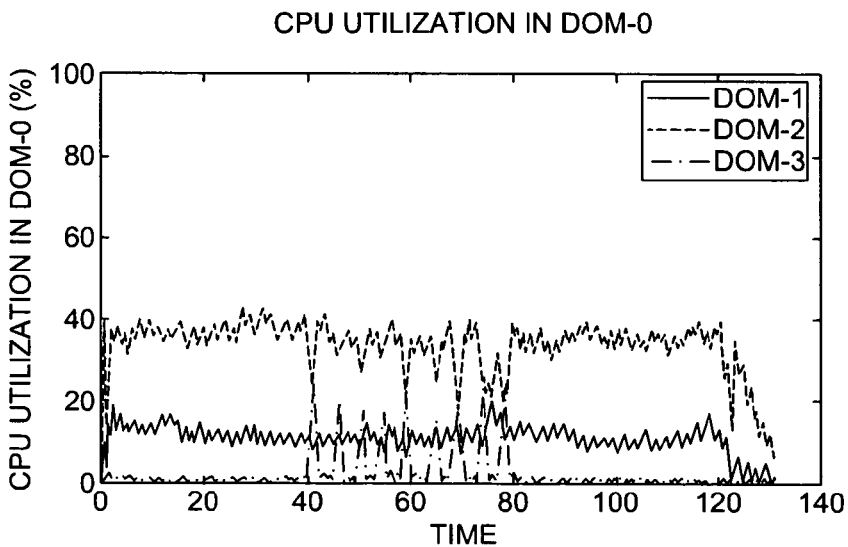

FIGS. 8A-8C show the results, as a function of time as the experiment proceeds without employing the above-described exemplary embodiment of ShareGuard logic 12A. A significant decrease in both web server throughputs can be clearly seen in FIG. 8A. It should be noted how the CPU utilization for Domain-3 jumps for the duration of its file transfer, as shown in FIG. 8B. The split-up of CPU utilization in Domain-0 for the corresponding interval is the center of our attention in this exemplary case study. As shown in FIG. 9C Domain-3 uses between 20% to 30% of CPU for I/O processing in Domain-0.

TABLE 1

ShareGuard at work: metric values averaged over the middle 40 second segment of the runs.

| Metric | Baseline | Without SG | With SG |
| --- | --- | --- | --- |
| Dom-1 Webserver | 329.85 | 236.8 | 321.13 |
| Dom-2 Webserver | 231.49 | 166.67 | 211.88 |
| Dom-0 for Dom-1 | 11.55 | 7.26 | 11.9 |
| Dom-0 for Dom-2 | 37.41 | 23.9 | 34.1 |
| Dom-0 for Dom-3 | N/A | 23.92 | 4.42 |

The "Baseline" column in Table 1 above provides a summary of average metrics values for the "baseline" case, where Domain-1 and Domain-2 meet customer performance expectations and deliver expected web server throughputs in this exemplary case study. These metrics reflect Domain-1 and Domain-2 performance when there is no competing I/O traffic issued by Domain-3 in the experiment. An interesting observation in this example is that combined CPU share in Domain-0 for I/O processing by Domain-1 and Domain-2 on average is about 50%. Since Domain-0 CPU share is allocated to 60%, there are about 10% of available CPU for additional I/O processing in Domain-0.

The average metrics values over the middle 40 second segment (where Domain-1, Domain-2, and Domain-3 all compete for CPU processing in Domain-0) in this exemplary case study without ShareGuard being enabled are summarized in the "Without SG" column of Table 1. On average, Domain-3 gets 23.92% of CPU for I/O processing in Domain-0, squeezing in the CPU share available for Domain-1's and Domain-2's I/O processing. As a result, there is a devastating decrease in achievable web server throughputs: both webservers are delivering only 72% of their expected baseline capacity in this case study.

This example clearly indicates the lack of control in IDD on CPU consumption by different guest domains. This uncontrolled competition for CPU resources in the driver domain can lead to violation of performance isolation among the guest domains when one guest domain has a significant negative impact on performance of the other guest domains sharing the same infrastructure.

The question is whether employing the above-described embodiment of ShareGuard logic 12A can help in controlling an amount of CPU used for I/O processing in Domain-0 on behalf of different guest domains. In particular, whether ShareGuard logic 12A can be used to limit the CPU usage in Domain-0 when it acts on behalf of Domain-3 to 5% and to prevent its negative impact on performance of webservers running in Domain-1 and Domain-2.

To evaluate this, we next repeated the same experiment with ShareGuard logic 12A enabled. ShareGuard logic 12A was configured to restrict Domain-3's share in Domain-0 to 5%. FIGS. 9A-9C shows the results for this exemplary case study with the embodiment of ShareGuard logic 12A enabled.

Recall the operation of this exemplary embodiment of ShareGuard logic 12A: every 500 ms it evaluates CPU usage in IDD. If ShareGuard logic 12A detects that a VM is violating its share of CPU in the IDD, ShareGuard logic 12A turns off all traffic processing for that VM for some time. We compute this duration such that over that interval, the average CPU utilization of the VM within the IDD will comply with the specification (i.e., with the defined CPU limit for the IDD on behalf of the VM). This mode of operation is clearly visible in FIG. 9C. In this example, ShareGuard logic 12A is directed to restrict Domain-3's consumption in Domain-0 to 5%. At t=40 seconds (s), ShareGuard logic 12A detected that Domain-3 had consumed almost 30% CPU in Domain-0. Accordingly, ShareGuard logic 12A disabled traffic processing for Domain-3 for the next 2.5 seconds, such that the average utilization over this 3 second window would be 5%. This pattern is subsequently repeated ensuring that the performance isolation guarantee is maintained through the entire run.

Comparing FIGS. 8C (showing performance with the ShareGuard logic disabled) and 9C (showing performance with the ShareGuard logic enabled), it can be seen that with ShareGuard logic 12A enabled, Domain-1 and Domain-2 obtain more uniform service in Domain-0 even in the presence of Domain-3's workload. This is also visible in the CPU utilizations (see FIG. 9B). Finally, it should be observed that the webserver throughputs for Domain-1 and Domain-2 in this exemplary case study improve significantly when ShareGuard logic 12A is employed: both webservers deliver the expected throughput.

The "With SG" column in Table 1 above provides a summary of average metric values over the middle 40 second segment with ShareGuard logic 12A enabled for this exemplary case study. As can be seen, CPU consumption by Domain-1 and Domain-2 as well as web server throughputs are similar to the baseline case. Web server performance is not further impacted by the bulk data transfer in Domain-3 because CPU processing in the driver domain on behalf of Domain-3 is controlled by ShareGuard logic 12A.

The exemplary aggregate proportional-share scheduler 32 and/or controller 12 (e.g., ShareGuard logic 12A) described herein, when implemented via computer-executable instructions, are in essence the software code defining the operations thereof. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. In certain embodiments, a CPU may execute the various logical instructions according to embodiments of the present invention. For example, a CPU may execute machine-level instructions according to the exemplary operational flows described above in conjunction with FIGS. 2A-2B and 4.

It shall be appreciated that the present invention is not limited to the architecture of the system on embodiments thereof may be implemented. For example, any suitable processor-based device may be utilized for implementing the above-described operations, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
   using a resource comprising a number of central processing units (CPUs) and a memory;
   determining an amount to which resource usage by a driver domain on behalf of a given virtual machine (VM) is to be limited; and
   controlling the resource usage by the driver domain on behalf of the given VM so as not to exceed the determined amount by taking defensive action that comprises at least one of the following:
   stop accepting, by the driver domain, incoming traffic to the given VM; and
   stop processing, by the driver domain, outgoing traffic from the given VM.

2. The method of claim 1 wherein said controlling comprises:
   controlling said resource usage by a controller implemented within the driver domain.

3. The method of claim 1 comprising:
   determining a proportional share of resource usage for the driver domain, wherein the determined amount to which resource usage by the driver domain on behalf of the given VM is to be limited is less than the proportional share of resource usage for the driver domain.

4. The method of claim 3 wherein the controlling comprises:
   when the determined amount to which the resource usage by the driver domain on behalf of the given VM is to be limited is reached, taking defensive action to prevent further resource usage by the driver domain on behalf of the given VM.

5. The method of claim 1 wherein the determining the amount to which resource usage by the driver domain on behalf of the given VM is to be limited comprises:
   determining an amount to which resource usage by the driver domain on behalf of the given VM in a scheduling interval is to be limited.

6. The method of claim 5 comprising:
   determining a proportional share of resource usage for the driver domain in the scheduling interval, wherein the determined amount to which resource usage by the driver domain on behalf of the given VM in the scheduling interval is to be limited is less than the proportional share of resource usage for the driver domain in the scheduling interval.

7. The method of claim 6 wherein the controlling comprises:
   when the determined amount to which the resource usage by the driver domain on behalf of the given VM is to be limited is reached in a given scheduling interval, taking defensive action to prevent further resource usage by the driver domain on behalf of the given VM in the given scheduling interval.

8. The method of claim 1 further comprising:
   determining an aggregate proportional share of resource usage to be scheduled for the given VM, wherein the aggregate proportional share of resource usage includes resource usage by the driver domain on behalf of the given VM; and
   wherein the determining the amount to which resource usage by the driver domain on behalf of the given VM is to be limited comprises determining the amount as a function of the determined aggregate proportional share of resource usage to be scheduled for the given VM.

9. The method of claim 1 comprising:
   determining a proportional share of a scheduling interval of resource usage to be allocated to the driver domain; and
   wherein the determining the amount to which resource usage by the driver domain on behalf of the given VM is to be limited comprises determining the amount as a function of the proportional share of the scheduling interval determined to be allocated to the driver domain.

10. The method of claim 1 wherein the resource usage comprises central processing unit (CPU) usage in addition to the driver domain usage.

11. The method of claim 1 wherein the driver domain comprises a network device driver that is used by the given VM for communicating via a communication network.

12. Computer-executable software code stored to a non-transitory computer-readable medium, the computer-executable software code executable by a number of processors as:
    code for determining whether a threshold amount of resource usage by a driver domain on behalf of a given virtual machine (VM) in a scheduling interval is reached;
    code for, responsive to determining that the threshold amount is reached, taking defensive action to prevent resource usage by the driver domain on behalf of the given VM in the scheduling interval from exceeding the threshold amount, wherein the defensive action comprises at least one of the following:
    stop accepting, by the driver domain, incoming traffic to the given VM; and
    stop processing, by the driver domain, outgoing traffic from the given VM.

13. The computer-executable software code of claim 12 comprising:
    code for determining a proportional share of resource usage in the scheduling interval for the driver domain, wherein the threshold amount is less than the proportional share of resource usage for the driver domain.

14. The computer-executable software code of claim 12 further comprising:
    code for determining an aggregate proportional share of resource usage to be scheduled for the given VM, wherein the aggregate proportional share of resource usage includes resource usage by the driver domain on behalf of the given VM and resource usage by the VM; and
    code for determining the threshold amount of resource usage as a function of the determined aggregate proportional share of resource usage to be scheduled for the given VM.

15. A system comprising:
    virtual machine (VM);
    driver domain;
    shared resource that is usable by the VM and by the driver domain, wherein the shared resource comprises a number of central processing units (CPUs) and a memory; and
    controller for limiting usage of the shared resource by the driver domain on behalf of the VM to prevent the usage of the shared resource by the driver domain on behalf of the VM from exceeding a determined amount by taking defensive action that comprises at least one of the following:
    stop accepting, by the driver domain, incoming traffic to the given VM; and stop processing, by the driver domain, outgoing traffic from the given VM.

16. The system of claim 15 comprising:
a plurality of virtual machines (VMs), wherein said controller limits usage of the shared resource by the driver domain on behalf of each of the plurality of VMs to a respective determined amount for each of the plurality of VMs.

17. The system of claim 15 wherein the shared resource comprises a central processing unit (CPU).

18. The system of claim 15 further comprising:
an aggregate proportional-share scheduler that schedules aggregate usage of the shared resource for the VM in proportion to a respective weight assigned to the VM, wherein the aggregate usage of the shared resource by the VM comprises usage of the shared resource by the driver domain on behalf of the VM and usage of the shared resource by the VM; and
wherein the determined amount to which the controller limits usage of the shared resource by the driver domain on behalf of the VM is determined as a function of the aggregate usage of the VM.

19. The system of claim 15 wherein the driver domain comprises a network driver domain in which a device driver for network communication resides.

* * * * *